(12) United States Patent
Ootsuka

(10) Patent No.: US 6,237,665 B1
(45) Date of Patent: May 29, 2001

(54) APPARATUS FOR REMOVING LEAD CHARACTERS FROM CASSETTE

(75) Inventor: Yuzuru Ootsuka, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/332,134

(22) Filed: Jun. 14, 1999

(30) Foreign Application Priority Data

Jun. 12, 1998 (JP) .................................................. 10-165390

(51) Int. Cl.⁷ .......................... B32B 35/00; G03B 42/02; G03B 42/04; G21K 4/00
(52) U.S. Cl. .......................................... 156/584; 53/284.4
(58) Field of Search ..................................... 156/344, 584; 271/280, 281, 285; 53/284.4; 414/403, 411

(56) References Cited

U.S. PATENT DOCUMENTS 3,631,243 * 12/1971 Byler .
4,514,958 * 5/1985 Hoorn ................................ 414/403 X
4,783,588 * 11/1988 Schmidt et al. .................. 414/411 X
4,811,547 * 3/1989 Raats et al. .
4,893,011 * 1/1990 Bauer et al. ...................... 414/403 X
4,953,193 * 8/1990 Robinson .
4,960,994 * 10/1990 Muller et al. .
5,096,351 * 3/1992 Kondoh ............................ 53/284.4 X
5,109,649 * 5/1992 Azzaroni .............................. 53/284.4
5,400,099 * 3/1995 Neitzel et al. .
5,678,303 * 10/1997 Wichmann .

FOREIGN PATENT DOCUMENTS 63-247746 * 10/1988 (JP) .

* cited by examiner

Primary Examiner—Curtis Mayes
(74) Attorney, Agent, or Firm—Sughrue, Mion, Zinn, Macpeak & Seas, PLLC

(57) ABSTRACT

A lead character removing apparatus has a roller disposed in a cassette loading section and rotatable in a position where lead characters applied to a cassette pass, and a rotating mechanism for rotating the roller relatively to the cassette in a direction opposite to the direction in which the cassette is loaded, thereby to remove the lead characters off the cassette. Thus, the lead characters can easily and reliably be removed from the cassette with a simple arrangement.

18 Claims, 10 Drawing Sheets

APPARATUS FOR REMOVING LEAD CHARACTERS FROM CASSETTE

BACKGROUND OF THE INVENTION

1. Field of the Invention

The present invention relates to an apparatus for removing lead characters from a cassette which stores an image information recording medium carrying recorded radiation image information when the cassette is loaded into a processor.

2. Description of the Related Art

Generally, it has been the customary practice to apply a radiation such as X-rays, for example, to a subject such as a human body to record radiation image information of the subject on a photographic film such as an X-ray photographic film. The photographic film is then subjected to an image developing process to produce a visible image of the subject on the photographic film. The visible image is used for a medical diagnosis or the like.

The photographic film is usually stored in a cassette, and the cassette with the photographic film stored therein is loaded into an exposure apparatus. In the exposure apparatus, X-rays that have passed through a subject are applied to the photographic film through the cassette. Thereafter, the cassette is removed from the exposure apparatus and then loaded into an image developing apparatus (processor) in which the photographic film is delivered from the cassette and subjected to the image developing process.

Lead characters representing various items of information of the subject, e.g., the name, the date of exposure, and the recorded region, are often applied to the cassette. Therefore, the radiation image information of the subject and the various items of information of the subject as represented by the lead characters are recorded on the photographic film in the cassette, allowing the photographic film to be handled with ease.

There has been known a radiation image recording and reproducing system for recording radiation image information of a subject, such as a human body, using a stimulable phosphor, and either reproducing the recorded radiation image information on a photosensitive medium such as a photographic film or the like or displaying the recorded radiation image information on a cathode-ray tube or other display units.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending the stored radiation energy. Such a phosphor is referred to as a stimulable phosphor.

A stimulable phosphor is usually used in the form of a sheet which is referred to as a stimulable phosphor sheet. Such a stimulable phosphor sheet is stored in a cassette. Lead characters representing various items of information of a subject, whose radiation image information has been recorded on a stimulable phosphor sheet, are also applied to a cassette which stores the stimulable phosphor sheet.

When a cassette storing a photographic film on which radiation image information has been recorded is loaded into an image developing apparatus, or when a cassette storing a stimulable phosphor sheet on which radiation image information has been recorded is loaded into an image information reading apparatus (processor), it is necessary to remove the lead characters from the cassette. However, lead characters are occasionally left unremoved from cassettes which store photographic films or stimulable phosphor sheets. If such lead characters are not removed from a cassette, then the lead characters remain in the processor and tend to fall in the processor, causing a feed failure of the photographic film or stimulable phosphor sheet.

Another possibility is that a new photographic film or stimulable phosphor sheet may be placed into a cassette which carries lead characters about a previous subject, and may be exposed to a radiation image of a new subject. When this happens, the various items of information of the previous subject as represented by the existing lead characters are recorded on the new photographic film or stimulable phosphor sheet, resulting in a discrepancy between the newly recorded radiation image information and the previously recorded various items of information.

SUMMARY OF THE INVENTION

It is a principal object of the present invention to provide an apparatus for removing lead characters from a cassette to reliably prevent the lead characters from re5 maining or falling in a processor and to provide effective protection against a failure to remove the lead characters from the cassette.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
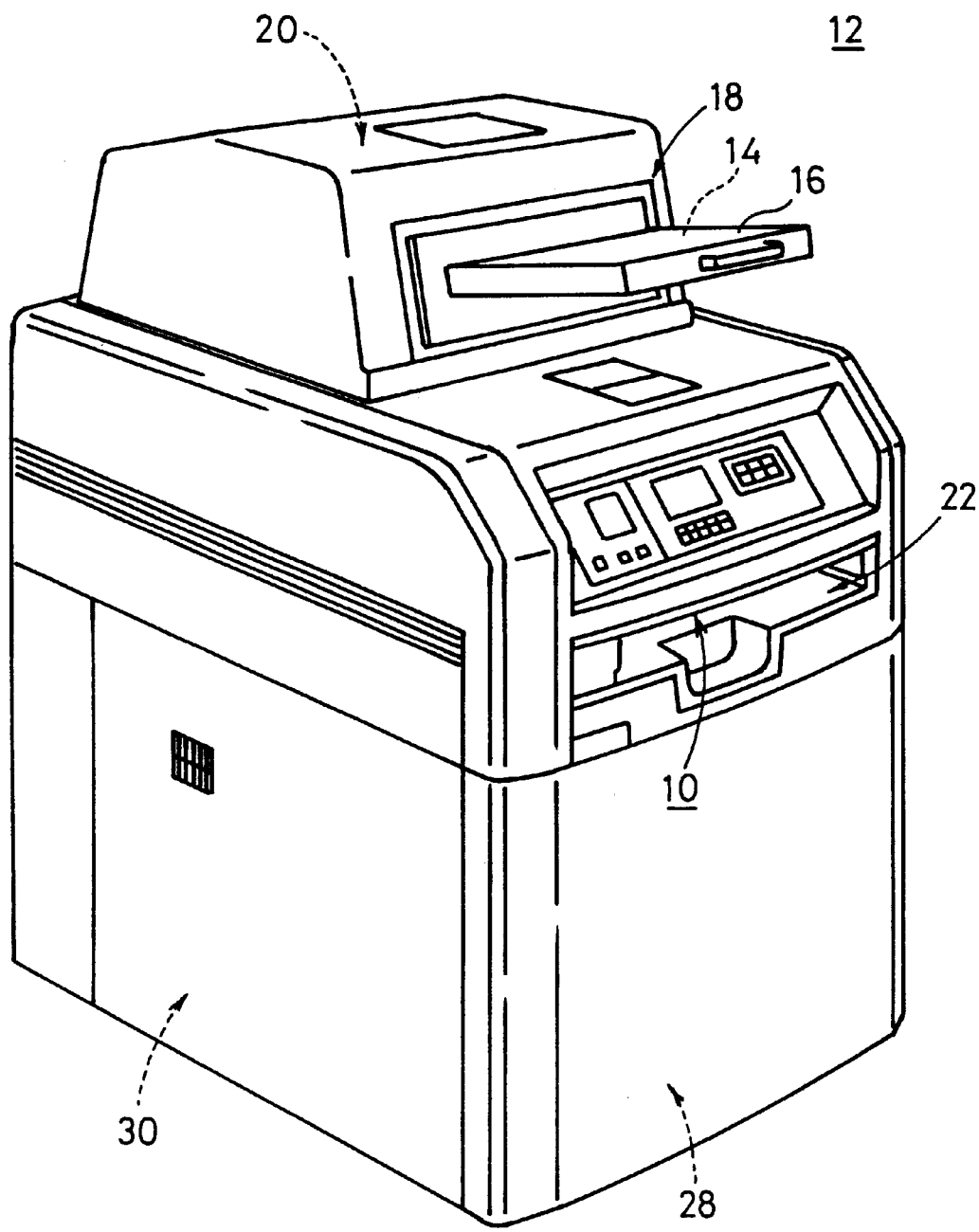
FIG. 1 is a perspective view of a film supply apparatus incorporating therein a lead character removing apparatus according to a first embodiment of the present invention.
Figure 2:
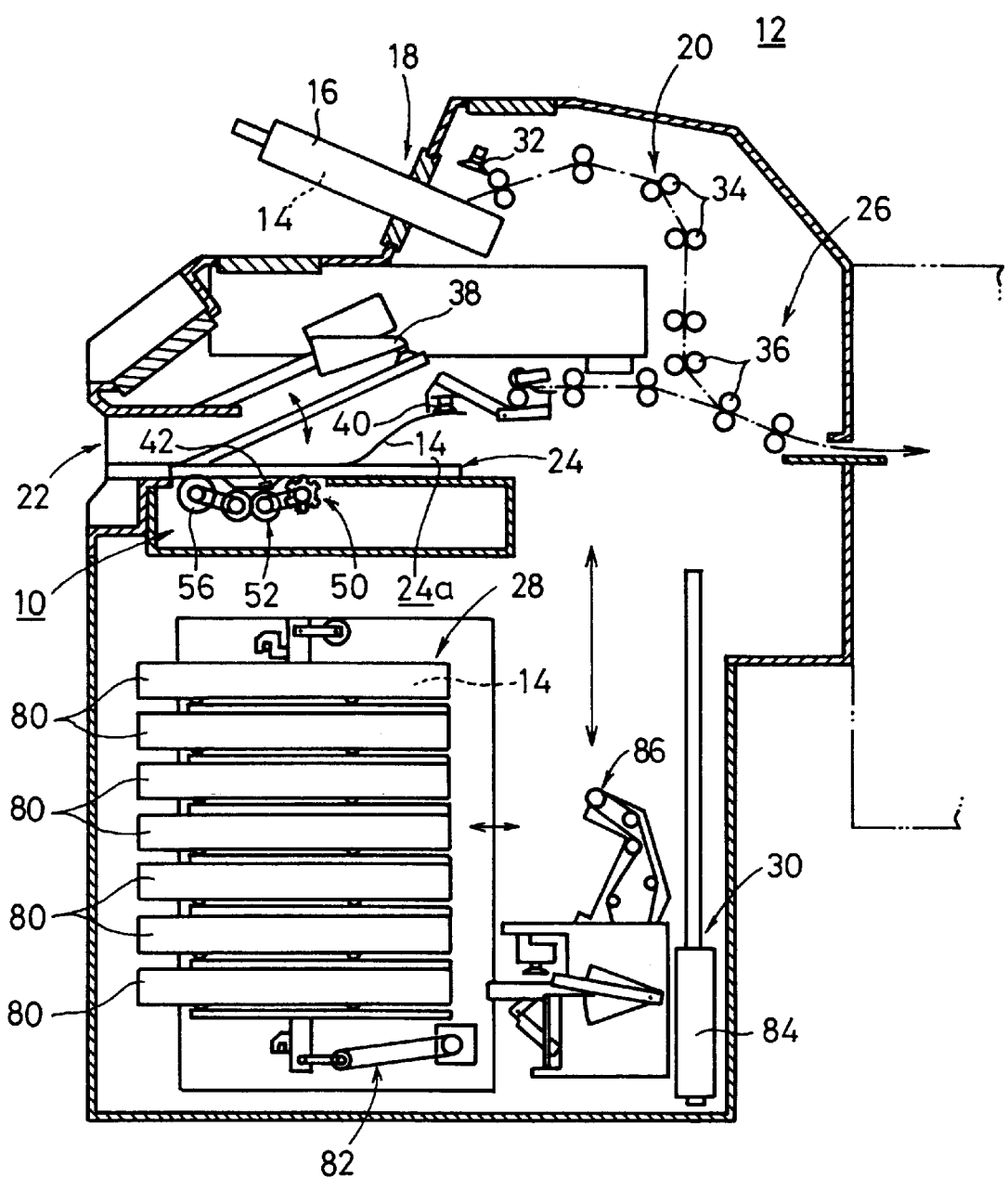
FIG. 2 is a vertical cross-sectional view of the film supply apparatus shown in FIG. 1.

As shown in FIGS. 1 and 2, a film supply apparatus 12 which incorporates therein a lead character removing apparatus 10 according to a first embodiment of the present invention has a magazine loading section 18 disposed in an upper portion of a front surface (control surface) of the film supply apparatus 12, for loading a magazine 16 which stores a plurality of photographic films (image information recording mediums) 14. The film supply apparatus 12 has an automatic feeder 20 disposed behind the magazine loading section 18 for feeding the photographic films 14 one at a time.

The film supply apparatus 12 also has a cassette loading section 22 disposed underneath the magazine loading section 18, for loading a cassette 24 (see FIG. 2) which stores a photographic film 14. As shown in FIG. 2, the film supply apparatus 12 includes a film delivery mechanism 26 disposed behind the cassette loading section 22 for delivering the photographic film 14 removed from the cassette 24 and the photographic film 14 fed by the automatic feeder 20 to an automatic image developing machine (not shown). The film supply apparatus 12 further has a supply magazine assembly 28 disposed below the lead character removing apparatus 10 for storing unused photographic films 14 and a vertical film delivery unit 30 disposed behind the supply magazine assembly 28 for removing one, at a time, of the unused photographic films 14 from the supply magazine assembly 28 and delivering the removed unused photographic film 14 into the cassette 24 placed in the cassette loading section 22.

The automatic feeder 20 comprises a suction cup 32 for attracting and removing one, at a time, of the photographic films 14 from the magazine 16, and a plurality of roller pairs 34 for feeding the photographic film 14 removed by the suction cup 32 to a plurality of roller pairs 36 of the film delivery mechanism 26.

The cassette loading section 22 has an opening and closing unit 38 for opening and closing the cassette 24, and a suction cup 40 for removing the photographic film 14 from the cassette 24. Lead characters 42 are applied to an exposure side of the cassette 24 by an adhesive tape or the like. The lead characters 42 have a thickness ranging from 0.5 mm to 1.0 mm, for example. The lead character removing apparatus 10 according to the first embodiment is combined with the cassette loading section 22.

Figure 3:
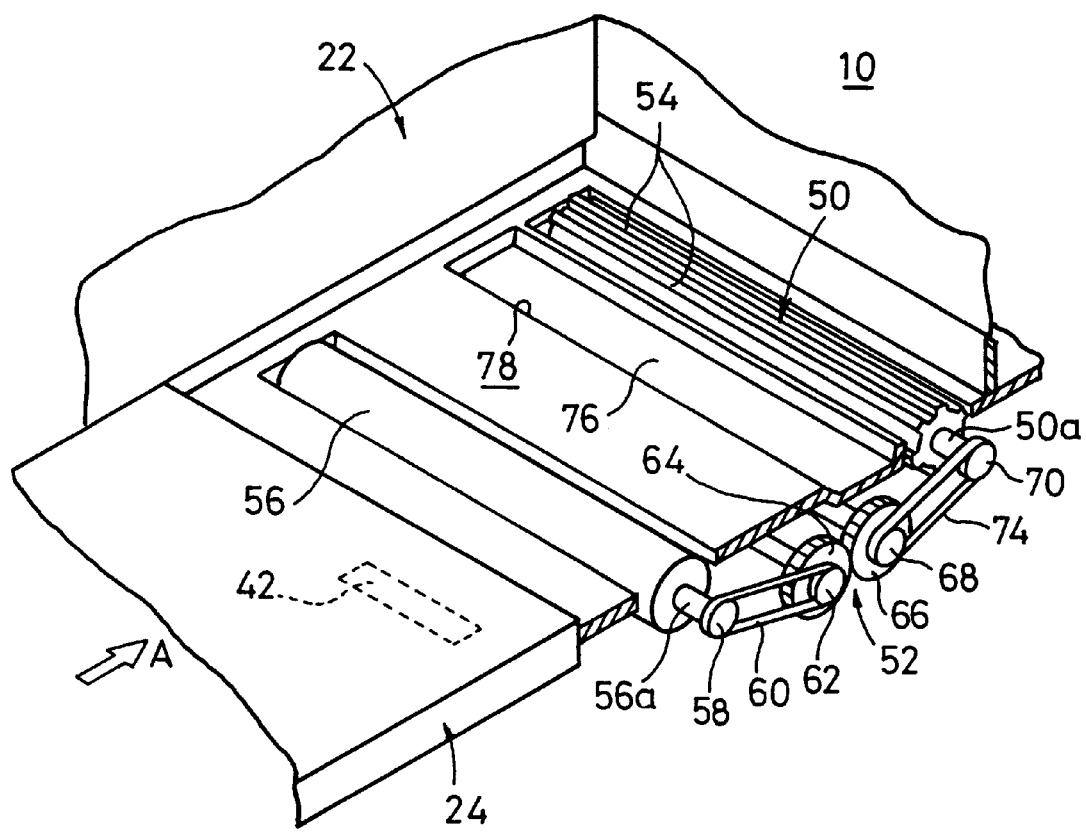
FIG. 3 is a fragmentary perspective view of the lead character removing apparatus.
Figure 4:
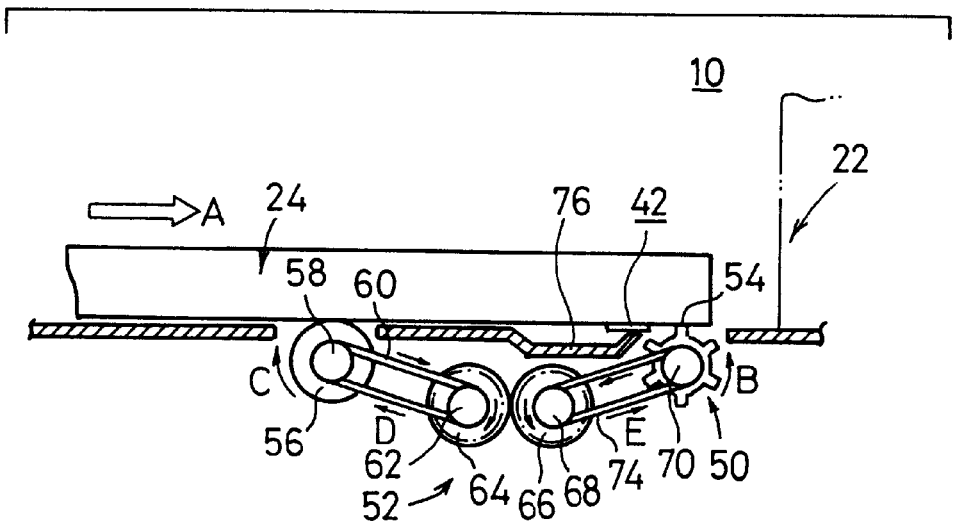
FIG. 4 is a side elevational view of the lead character removing apparatus.

As shown in FIGS. 3 and 4, the lead character removing apparatus 10 comprises a roller 50 rotatable about its own axis in a position where the lead characters 42 applied to the cassette 24 pass, and a rotating mechanism 52 for rotating the roller 50 relatively to the cassette 24 in a direction indicated by the arrow B, which is opposite to the direction indicated by the arrow A in which the cassette 24 is loaded.

The roller 50 is molded of synthetic resin and has a plurality of parallel axial ridges 54 projecting radially outwardly from an outer circumferential surface thereof. The ridges 54 may be formed by defining parallel axial grooves in the outer circumferential surface of the roller 50. The roller 50 of such a structure may be constructed as a vaned roller or a grooved roller.

The rotating mechanism 52 has a roller 56 positioned upstream of the roller 50 with respect to the direction indicated by the arrow A in which the cassette 24 is loaded. When the cassette 24 contacts the outer circumferential surface of the roller 56, the roller 56 is rotatable about its own axis in the direction indicated by the arrow C, which is the same as the direction indicated by the arrow A in which the cassette 24 is loaded, as the cassette 24 is loaded. The roller 56 provides such a coefficient of friction that it can be rotated by frictional contact with the cassette 24, and is made of synthetic resin, for example.

The roller 56 has a shaft 56a with a first pulley 58 fixed to an end thereof. A first belt 60 is trained around the first pulley 58 and a second pulley 62 coaxially fixed to a first gear 64 that is held in mesh with a second gear 66 to which a third pulley 68 is coaxially fixed. A second belt 74 is trained around the third pulley 68 and a fourth pulley 70 fixed to a shaft 50a of the roller 50.

The cassette loading section 22 has a lead character retrieval tray (lead character retrieval means) 76 disposed closely to and upstream of the roller 50 with respect to the direction indicated by the arrow A in which the cassette 24 is loaded. The lead character retrieval tray 76 is shaped and positioned depending on the position and dimensions of the lead characters 42 applied to the cassette 24. The cassette loading section 22 also has a recess 78 positioned above the lead character retrieval tray 76.

As shown in FIG. 2, the supply magazine assembly 28 has a vertical stack of supply magazines 80 each storing a plurality of unused photographic films 14. The supply magazines 80 are selectively pushed toward the vertical film delivery unit 30 by a pusher 82. The vertical film delivery unit 30 comprises a lifting and lowering mechanism 84 and a film gripping mechanism 86 for gripping one, at a time, of the photographic films 14 which are stored in each of the supply magazines 80.

Operation of the film supply apparatus 12 will be described below in connection with the lead character removing apparatus 10 according to the first embodiment of the present invention.

The cassette 24 storing the photographic film 14 on which radiation image information of a subject such as a human body has been recorded by an exposure apparatus (not shown) is loaded into the cassette loading section 22 of the film supply apparatus 12. As shown in FIGS. 3 and 4, when the cassette 24 is moved in the direction indicated by the arrow A in the cassette loading section 22, the exposure side of the cassette 24 contacts the roller 56 of the rotating mechanism 52, rotating the roller 56 in the direction indicated by the arrow C, which is the same as the direction indicated by the arrow A in which the cassette 24 is loaded.

Figure 5:
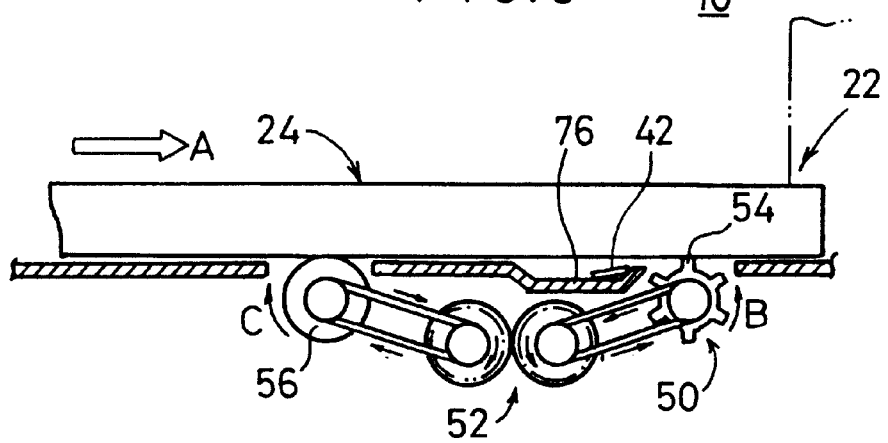
FIG. 5 is a side elevational view showing the manner in which the lead character removing apparatus operates.

When the roller 56 is rotated in the direction indicated by the arrow C, the first belt 60 is caused by the first and second pulleys 58, 62 to circulate in the direction indicated by the arrow D. Since the second gear 66 is held in mesh with the first gear 64 coaxially fixed to the second pulley 62, the second belt 74 circulates in the direction indicated by the arrow E, which is opposite to the direction indicated by the arrow D in which the first belt 60 circulates. Therefore, the roller 50 rotates in the direction indicated by the arrow B, which is opposite to the direction indicated by the arrow A in which the cassette 24 is loaded. As shown in FIG. 5, the roller 50 rotates in the direction indicated by the arrow B while being held against the exposure side of the cassette 24.

Consequently, the lead characters 42 applied to the exposure side of the cassette 24 are scraped off the cassette 24 by the ridges 54 of the rotating roller 50, and received by the lead character retrieval tray 76. The cassette 24 from which the lead characters 42 have been removed is further pushed into the cassette loading section 22, and then held in a given position by a stop (not shown).

Then, as shown in FIG. 2, the opening and closing unit 38 is actuated to open an opening 24a of the cassette 24 in the film supply apparatus 12, and the suction cup 40 is activated to remove the photographic film 14 from the cassette 24. The photographic film 14 attracted by the suction cup 40 is fed to the film delivery mechanism 26, then transferred to the roller pairs 36 of the film delivery mechanism 26, and delivered by the roller pairs 36 into the automatic image developing machine (not shown).

In the supply magazine assembly 28, one of the supply magazines 80 is pushed toward the vertical film delivery unit 30 by the pusher 82. The film gripping mechanism 86 of the vertical film delivery unit 30 then grips one of the photographic films 14 stored in the supply magazine 80. The lifting and lowering mechanism 84 is operated to lift the film gripping mechanism 86 to deliver the photographic film 14 gripped thereby into the cassette 24 that is held open in the cassette loading section 22. After the cassette 24 is closed by the opening and closing unit 38, the cassette 24 is unloaded from the cassette loading section 22. If necessary, lead characters 42 representing various items of information of a new subject are applied to the exposure side of the unloaded cassette 24, and the cassette 24 is sent to the exposure apparatus (not shown).

When the magazine 16 is loaded into the magazine loading section 18, the suction cup 32 of the automatic feeder 20 removes one, at a time, of the photographic films 14 from the magazine 16. The removed photographic film 14 is transferred from the suction cup 32 to the roller pairs 34 and then to the roller pairs 36 of the film delivery mechanism 26, from which the photographic film 14 is delivered into the automatic image developing machine (not shown).

In the first embodiment, when the cassette 24 is loaded into the cassette loading section 22, the roller 50 is rotated in the direction indicated by the arrow B, which is opposite to the direction indicated by the arrow A in which the cassette 24 is loaded, by the rotating mechanism 52 which has the roller 56 rotating in frictional contact with the cassette 24. Consequently, simply when the cassette 24 is loaded into the cassette loading section 22, the lead characters 42 applied to the cassette 24 can easily and reliably be scraped off the cassette 24 by the roller 50. No independent dedicated actuator for rotating the roller 50 is required because the roller 50 is rotated automatically in response to the loading movement of the cassette 24 into the cassette loading section 22.

As a result, the lead characters 42 applied to the cassette 24 are prevented from remaining in the cassette loading section 22 or falling in the film supply apparatus 12, and hence the film supply apparatus 12 will not suffer feed failures or malfunctions.

Because the lead characters 42 are reliably removed from the cassette 24 simply when the cassette 24 is loaded into the cassette loading section 22, it is possible to provide secure protection against a failure to remove the lead characters 42 from the cassette 24. When a new photographic film 14 stored in the cassette 24 is exposed to radiation image information of a new subject, therefore, the cassette 24 is free of any previously used lead characters 42. Consequently, no disagreement occurs between the radiation image information of the subject which is recorded on the photographic film 14 stored in the cassette 24 and the various items of information represented by the lead characters 42 applied to the cassette 24.

In the first embodiment, furthermore, the lead characters 42 scraped off the cassette 24 by the roller 50 are retrieved by the lead character retrieval tray 76 positioned closely to and upstream of the roller 50. Inasmuch as the removed lead characters 42 are safely retrieved by the lead character retrieval tray 76, they do not fall in the film supply apparatus 12.

Since the ridges 54 of the roller 50 rotate while in frictional contact with the exposure side of the cassette 24, they are effective in reliably scraping the lead characters 42 off the cassette 24. The roller 50 made of synthetic resin may be replaced with a brush roller for reliably scraping the lead characters 42 off the cassette 24.

In the illustrated first embodiment, the film supply apparatus 12 which incorporates the lead character removing apparatus 10 has the magazine loading section 18. However, the lead character removing apparatus 10 may be incorporated in a film supply apparatus in which only the cassette 24 is loaded, i.e., a film supply apparatus which is free of the magazine loading section 18 and the automatic feeder 20.

Figure 6:
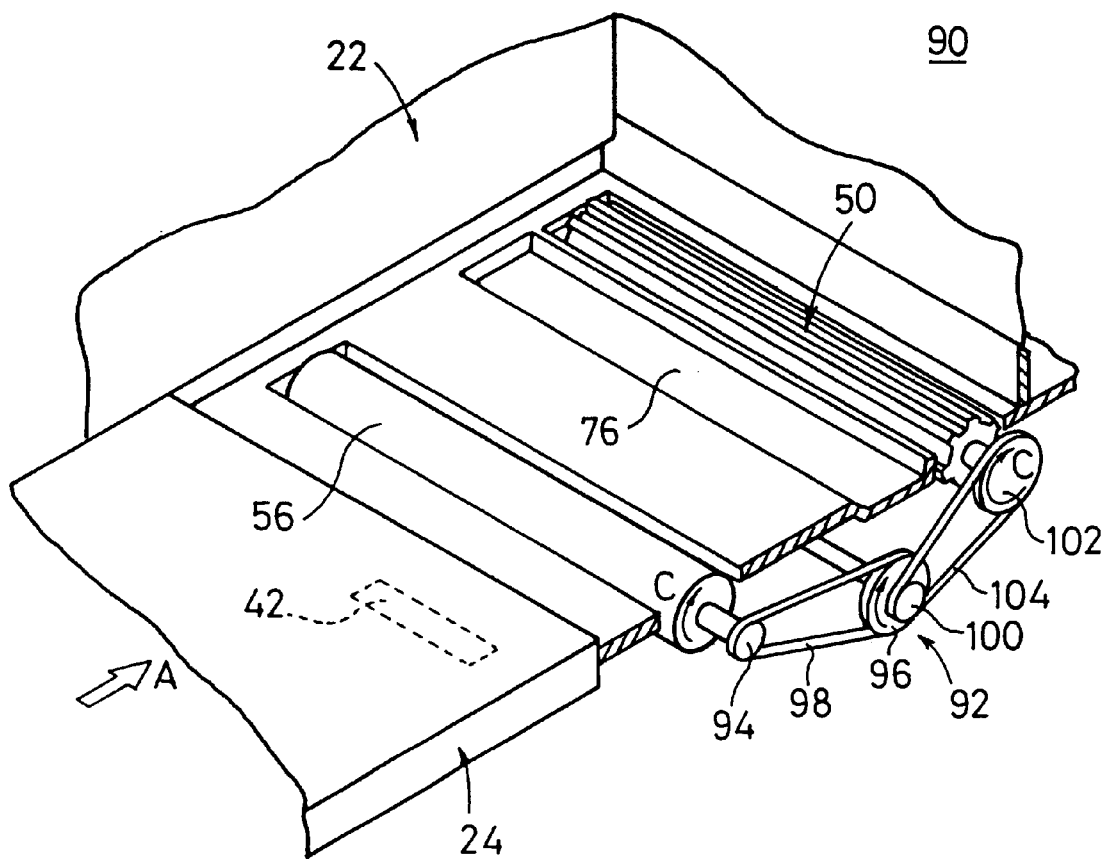
FIG. 6 is a fragmentary perspective view of a lead character removing apparatus according to a second embodiment of the present invention.

FIG. 6 shows in fragmentary perspective a lead character removing apparatus 90 according to a second embodiment of the present invention. Those parts of the lead character removing apparatus 90 which are identical to those of the lead character removing apparatus 10 according to the first embodiment are denoted by identical reference characters, and will not be described in detail below.

As shown in FIG. 6, the lead character removing apparatus 90 has a rotating mechanism 92 comprising a first pulley 94 coupled to the roller 56, a second pulley 96 larger in diameter than the first pulley 94, a first belt 98 trained around the first pulley 94 and the second pulley 96, a third pulley 100 coaxially fixed to the second pulley 96, a fourth pulley 102 coaxially fixed to the roller 50 and larger in diameter than the third pulley 100, and a second belt 104 trained around the third pulley 100 and the fourth pulley 102.

When the cassette 24 moves in the direction indicated by the arrow A, the roller 56 rotates in the direction indicated by the arrow C, and the roller 50 also rotates in the direction indicated by the arrow C. Since the second pulley 96 is larger in diameter than the first pulley 94 and the fourth pulley 102 is larger in diameter than the third pulley 100, the rotational speed of the roller 50 is considerably lower than the speed at which the cassette 24 is loaded in the direction indicated by the arrow A. Accordingly, the roller 50 rotates relatively to the cassette 24 in the direction opposite to the direction in which the cassette 24 is fed. Therefore, the lead character removing apparatus 90 according to the second embodiment is as effective in scraping the lead characters 42 off the cassette 24 as the lead character removing apparatus 10 according to the first embodiment.

Figure 7:
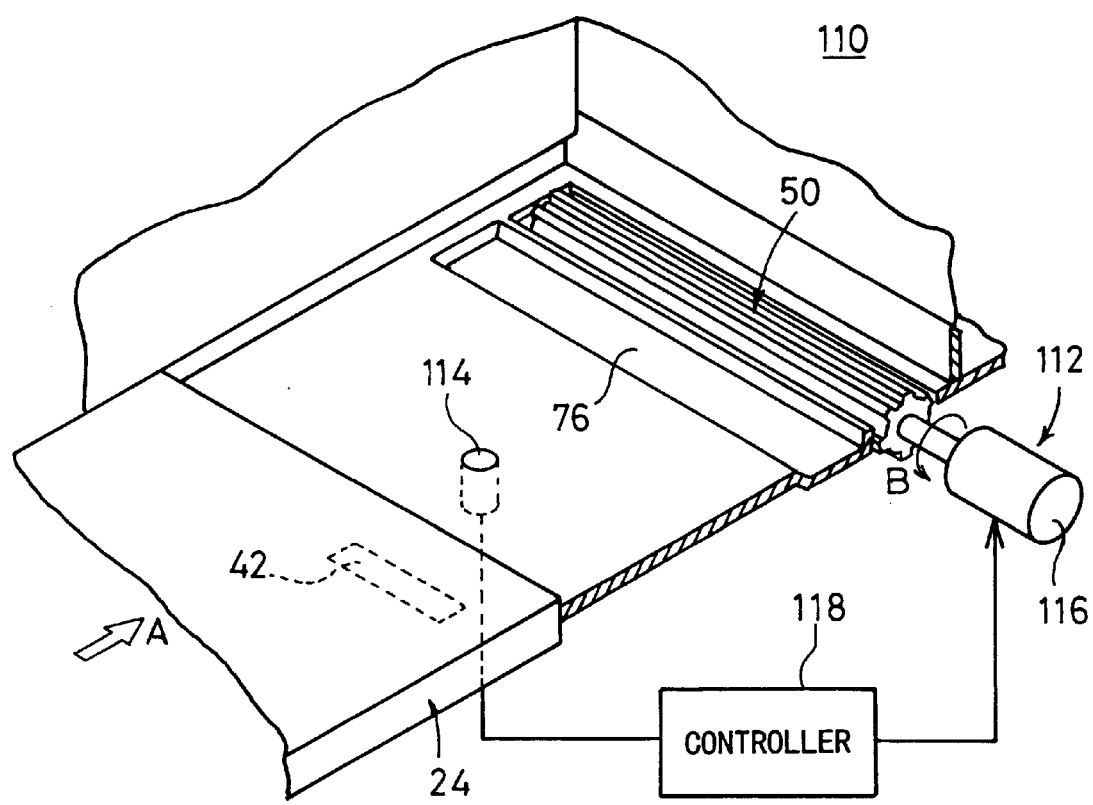
FIG. 7 is a fragmentary perspective view of a lead character removing apparatus according to a third embodiment of the present invention.

FIG. 7 shows in fragmentary perspective a lead character removing apparatus 110 according to a third embodiment of the present invention. Those parts of the lead character removing apparatus 110 which are identical to those of the lead character removing apparatus 10 according to the first embodiment are denoted by identical reference characters, and will not be described in detail below.

As shown in FIG. 7, the lead character removing apparatus 110 has a rotating mechanism 112 for rotating the roller 50 in the direction indicated by the arrow B, which is opposite to the direction indicated by the arrow A in which the cassette 24 is loaded. The rotating mechanism 112 comprises a detector 114 such as a proximity sensor or the like for detecting the cassette 24 as it is loaded into the cassette loading section 22, a rotary actuator 116 for rotating the roller 50 in a direction to scrape the lead characters 42 off the cassette 24, and a controller 118 connected to the detector 114 and the rotary actuator 116.

When the cassette 24 moves in the direction indicated by the arrow A, the detector 114 detects the cassette 24. The detector 114 sends a detected signal to the controller 118, which controls the rotary actuator 116 to rotate the roller 50 in the direction indicated by the arrow B. The roller 50 thus rotated reliably scrapes the lead characters 42 off the cassette 24.

In the third embodiment, the roller 50 can reliably scrape the lead characters 42 off the cassette 24. In addition, the cassette loading section 22 needs to be associated with only the detector 114 and the rotary actuator 116. Therefore, the lead character removing apparatus 110 allows its layout of components to be easily modified.

Figure 8:
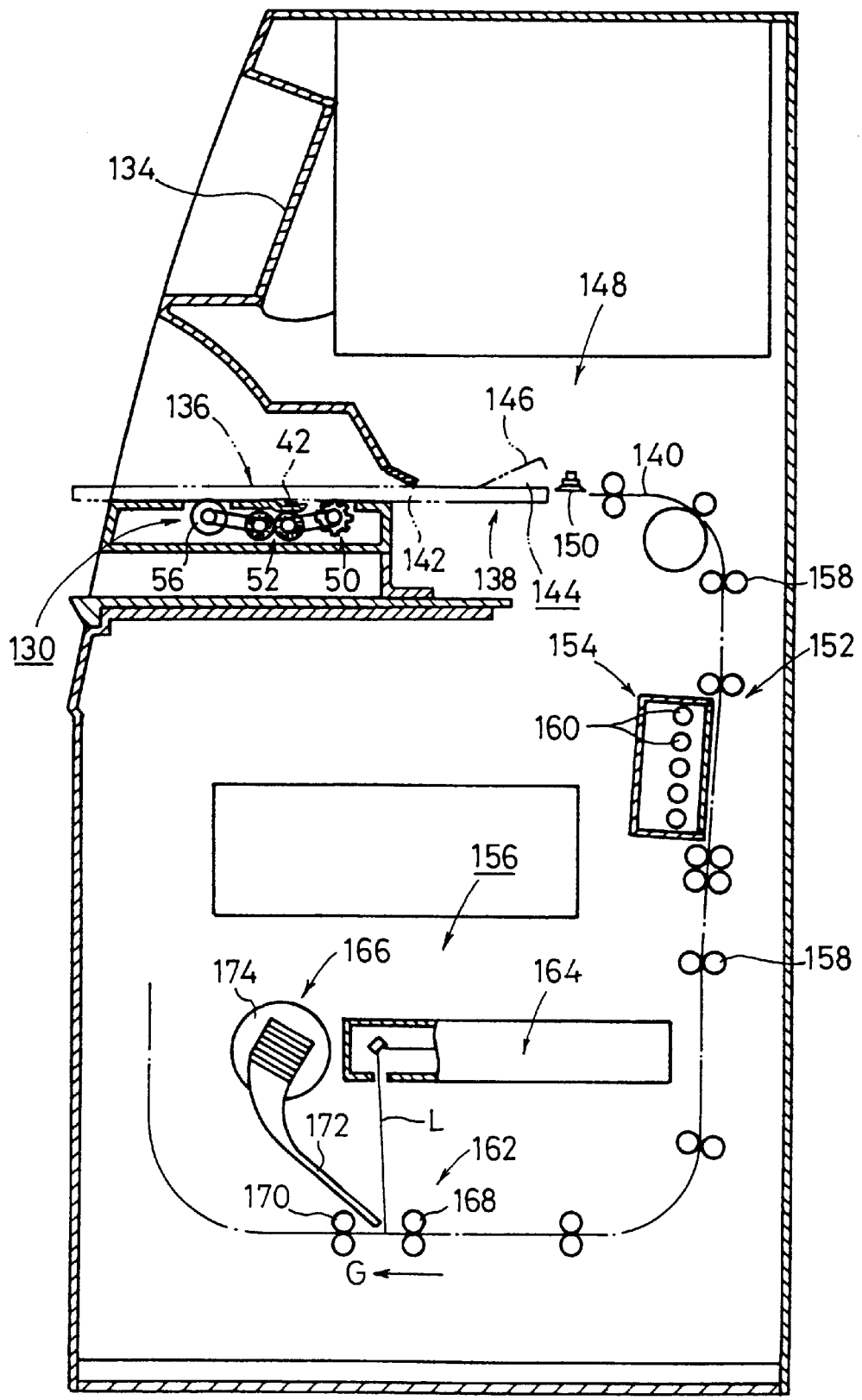
FIG. 8 is a vertical cross-sectional view of an image information reading apparatus incorporating therein a lead character removing apparatus according to a fourth embodiment of the present invention.

FIG. 8 shows in vertical cross section an image information reading apparatus 132 incorporating therein a lead character removing apparatus 130 according to a fourth embodiment of the present invention. The lead character removing apparatus 130 is identical in structure to the lead character removing apparatus 10 according to the first embodiment. Therefore, those parts of the lead character removing apparatus 130 which are identical to those of the lead character removing apparatus 10 according to the first embodiment are denoted by identical reference characters, and will not be described in detail below.

As shown in FIG. 8, the image information reading apparatus 132 has a touch panel 134 on an upper front face thereof which serves as a control console and a monitor. The image information reading apparatus 132 also has a cassette loading section 138 disposed below the touch panel 134 for loading and unloading a cassette 136. The cassette 136 comprises a housing 142 for storing a stimulable phosphor sheet (image information recording medium) 140 therein, and a lid 146 mounted on the housing 142 for opening and closing an opening 144 defined in the housing 142. The cassette loading section 138 has a lid opening/closing mechanism (not shown) for opening and closing the lid 146.

The cassette loading section 138 includes a sheet feeder 148 for removing the stimulable phosphor sheet 140 from the cassette 136 and returning the stimulable phosphor sheet 140, from which recorded image information has been read, into the cassette 136. The sheet feeder 148 has a plurality of suction cups 150 communicating with a vacuum source (not shown).

The image information reading apparatus 132 further includes an erasing section 154 and a reading section 156 which are connected to the sheet feeder 148 through a sheet delivery system 152. The sheet delivery system 152 has a plurality of roller pairs 158 providing a vertical delivery path on which a plurality of erasing light sources 160 of the erasing section 154 are positioned.

The reading section 156 comprises an auxiliary scanning mechanism 162 for delivering a stimulable phosphor sheet 140 from the cassette 136 in an auxiliary scanning direction indicated by the arrow G, an optical system 164 for applying a laser beam L as it is deflected in a main scanning direction (substantially perpendicular to the auxiliary scanning direction) to the stimulable phosphor sheet 140 as it is delivered in the auxiliary scanning direction, and a light guiding system 166 for photoelectrically reading light which is emitted from the stimulable phosphor sheet 140 upon exposure to the laser beam L.

The auxiliary scanning mechanism 162 has first and second roller pairs 168, 170 rotatable in synchronism with each other. The light guiding system 166 has a light guide 172 disposed near the position where the stimulable phosphor sheet 140 is scanned by the laser beam L and extending in the main scanning direction, and a photomultiplier 174 mounted on an upper end of the light guide 172.

Operation of the image information reading apparatus 132 will be described below.

The stimulable phosphor sheet 140 on which radiation image information of a subject such as a human body has been recorded by an exposure apparatus (not shown) and which is stored in a light-shielded manner in the cassette 136 is inserted into the cassette loading section 138. At this time, the roller 56 of the lead character removing apparatus 130 is rotated in contact with the cassette 136, causing the rotating mechanism 52 to rotate the roller 50. Therefore, the roller 50 is rotated in the direction opposite to the direction in which the cassette 136 is loaded into the cassette loading section 138, for thereby reliably scraping the lead characters 42 off the cassette 136.

The lead character removing apparatus 130 according to the fourth embodiment is thus capable of easily and reliably scraping the lead characters 42 off the exposure side of the cassette 136 which stores the stimulable phosphor sheet 140 with a simple arrangement.

When the cassette 136 is set in the cassette loading section 138, the lid 146 of the cassette 136 is swung to a given angular position by an unlocking mechanism (not shown), opening the opening 144. Then, the sheet feeder 148 is actuated to move the suction cups 150 into the cassette 136. The suction cups 150 then attract the stimulable phosphor sheet 140 in the cassette 136. The suction cups 150 which has attracted the stimulable phosphor sheet 140 is displaced from the cassette 136 toward the sheet delivery system 152 until a leading end of the stimulable phosphor sheet 140 is gripped by one of the roller pairs 158 of the sheet delivery system 152.

The suction cups 150 release the stimulable phosphor sheet 140, which is transferred to the sheet delivery system 152. The sheet delivery system 152 delivers the stimulable phosphor sheet 140 through the erasing section 154 to the reading section 156.

In the reading section 156, since the first and second roller pairs 168, 170 rotate in synchronism with each other, the stimulable phosphor sheet 140 is fed in the auxiliary scanning direction indicated by the arrow G by the first and second roller pairs 168, 170. The optical system 164 is energized to apply the laser beam L to the stimulable phosphor sheet 140 in the main scanning direction. Upon exposure to the laser beam L, the stimulable phosphor sheet 140 emits light that is guided via the light guide 172 to the photo-multiplier 174, which photoelectrically reads the radiation image information recorded on the stimulable phosphor sheet 140 based on the light emitted from the stimulable phosphor sheet 140.

The stimulable phosphor sheet 140 from which the radiation image information has been read by the reading section 156 is fed back by the sheet delivery system 152. As the ID stimulable phosphor sheet 140 is fed upwardly along the vertical delivery path, remaining radiation image information is erased from the stimulable phosphor sheet 140 by the erasing light sources 160 of the erasing section 154. After the stimulable phosphor sheet 140 is delivered into the cassette 136 by the sheet feeder 148, the cassette 136 is unloaded from the cassette loading section 138. At this time, the lid 146 is closed over the housing 142 by a lid closing mechanism (not shown). The cassette 136 is thus removed, with its opening 144 fully closed, from the image information reading apparatus 132.

Figure 9:
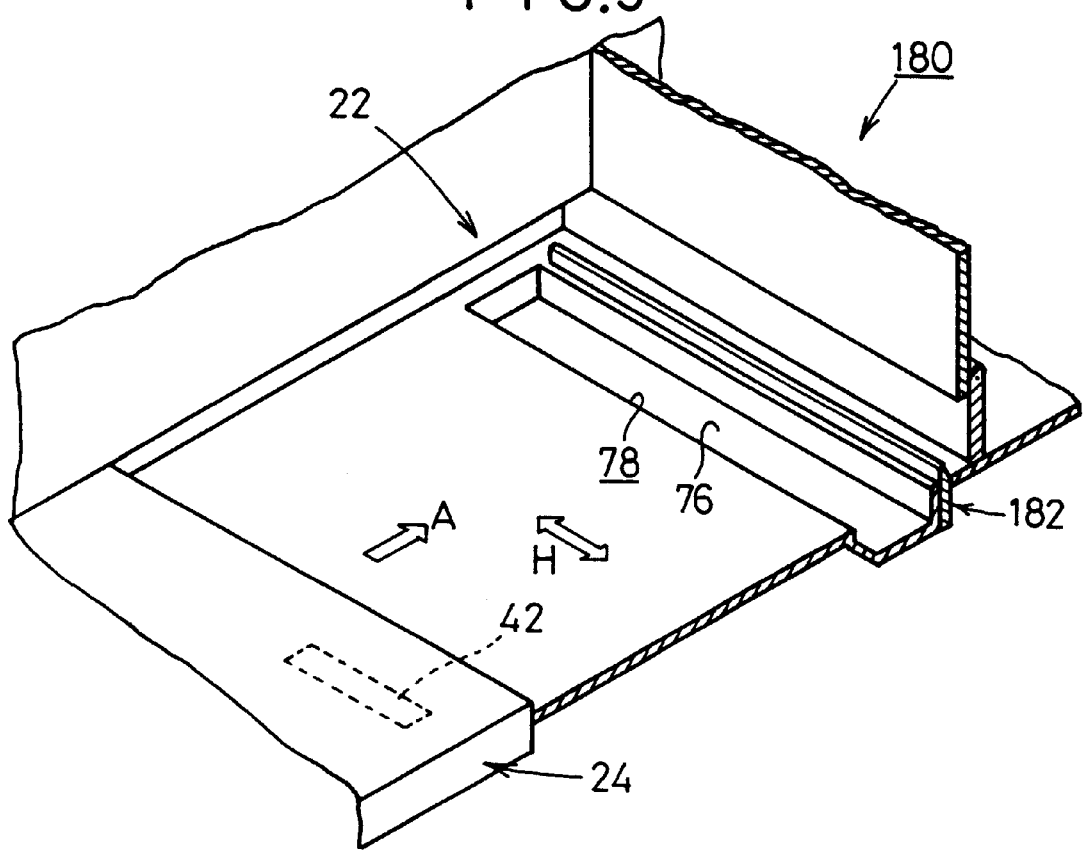
FIG. 9 is a fragmentary perspective view of a lead character removing apparatus according to a fifth embodiment of the present invention.
Figure 10:
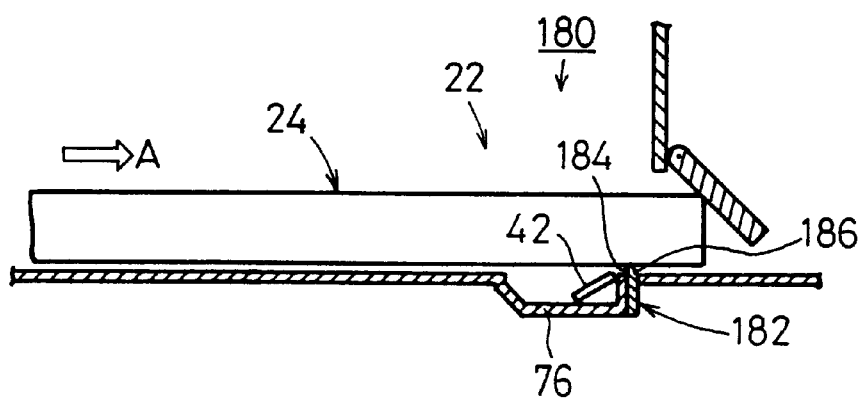
FIG. 10 is a side elevational view of the lead character removing apparatus.

FIG. 9 is a fragmentary perspective view of a lead character removing apparatus 180 according to a fifth embodiment of the present invention, and FIG. 10 is a side elevational view of the lead character removing apparatus 180.

The lead character removing apparatus 180 has a separating member 182 for forcibly removing the lead characters 42 such that the separating member 182 is in contact with the lead characters 42 applied to the cassette 24 when the cassette 24 is inserted in the cassette loading section 22. The separating member 182, which is made of synthetic rubber or resin, etc., extends in the direction (direction indicated by the arrow H) perpendicular to the direction in which the cassette 24 is loaded and has a wedged cross section. The separating member 182 has a vertical surface 184 extending vertically, and a tapered surface 186 provided on the upper part of the vertical surface 184 inclined downwardly toward the direction in which the cassette 24 is loaded.

In the lead character removing apparatus 180 constituted as above, the lead characters 42 applied to the cassette 24 becomes in contact with the upper part of the separating member 182 when the cassette 24 disposed in the cassette loading section 22 moves in the direction indicated by the arrow A, forcibly scraping the lead characters 42 off the cassette 24. The lead character removing apparatus 180 according to the fifth embodiment is thus capable of reliably scraping the lead characters 42 off with a simple arrangement, only by being provided with the separating member 182 in the shape of a plate.

Figure 11:
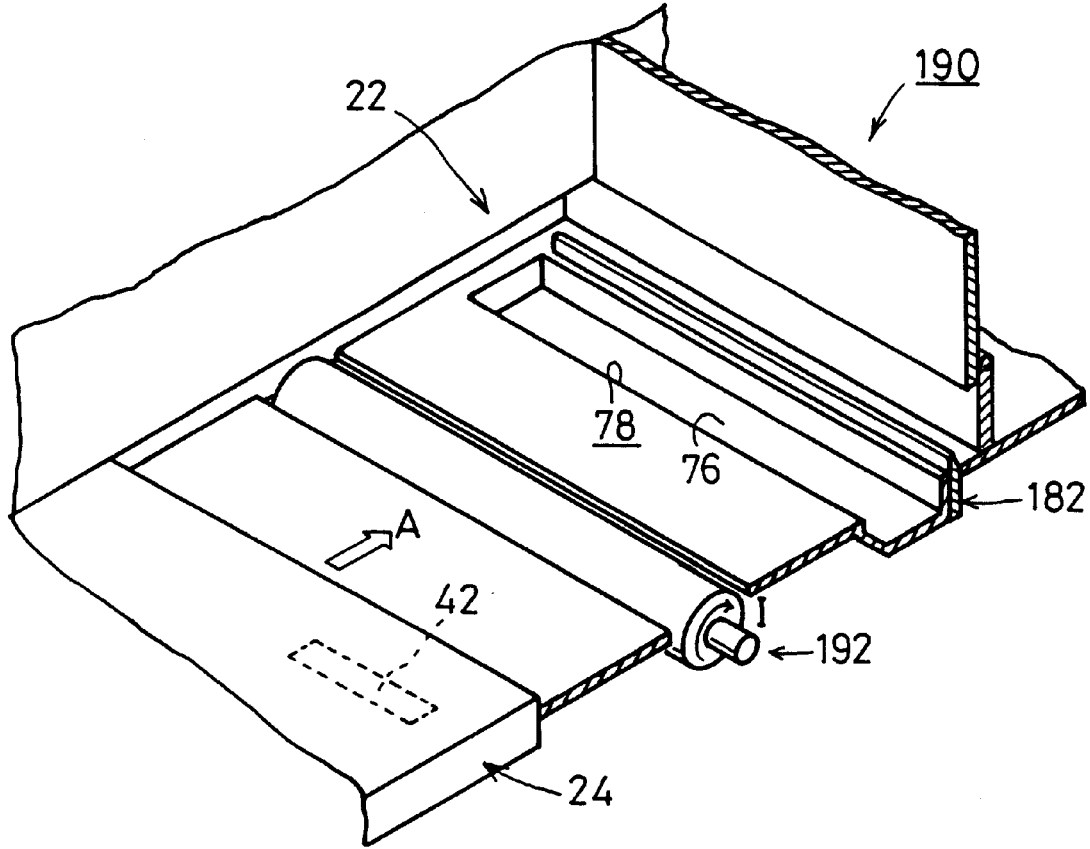
FIG. 11 is a fragmentary perspective view of a lead character removing apparatus according to a sixth embodiment of the present invention.
Figure 12:
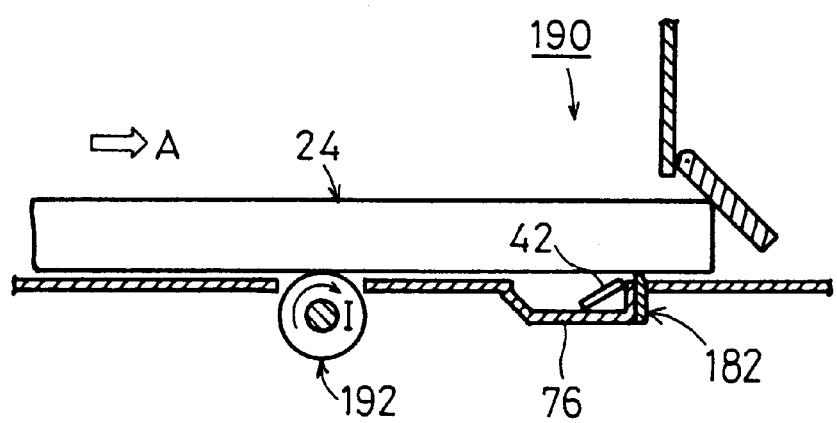
FIG. 12 is a side elevational view of the lead character removing apparatus.

FIG. 11 is a fragmentary perspective view of a lead character removing apparatus 190 according to a sixth embodiment of the present invention, and FIG. 12 is a side elevational view of the lead character removing apparatus 190.

The lead character removing apparatus 190 comprises the separating member 182 and an actuating roller 192 disposed upstream of the separating member 182 with regard to the di5 rection in which the cassette 24 is loaded. The actuating roller 192 is coupled with an unillustrated rotary actuator for automatically drawing the cassette 24 into the cassette loading section 22.

In the lead character removing apparatus 190 constituted as above, the actuating roller 192 is rotated in the direction indicated by the arrow I when an unillustrated sensor or the like detects that the cassette 24 is disposed in the cassette loading section 22. Therefore, the cassette 24 is automatically drawn into the cassette loading section 22 by the actuating roller 192, and the lead characters 42 applied to the cassette 24 becomes in contact with the separating member 182. Then the lead characters 42 are forcibly scraped off the cassette 24 and are received in the tray 76.

As described above, the lead character removing apparatus 190 according to the sixth embodiment is thus capable of simplifying the loading operation of the cassette 24 since the cassette 24 is automatically drawn into the cassette loading section 22. Further, the lead character removing apparatus 190 is also capable of reliably scraping the lead characters 42 off with a simple arrangement, in the similar manner of the fifth embodiment.

Figure 13:
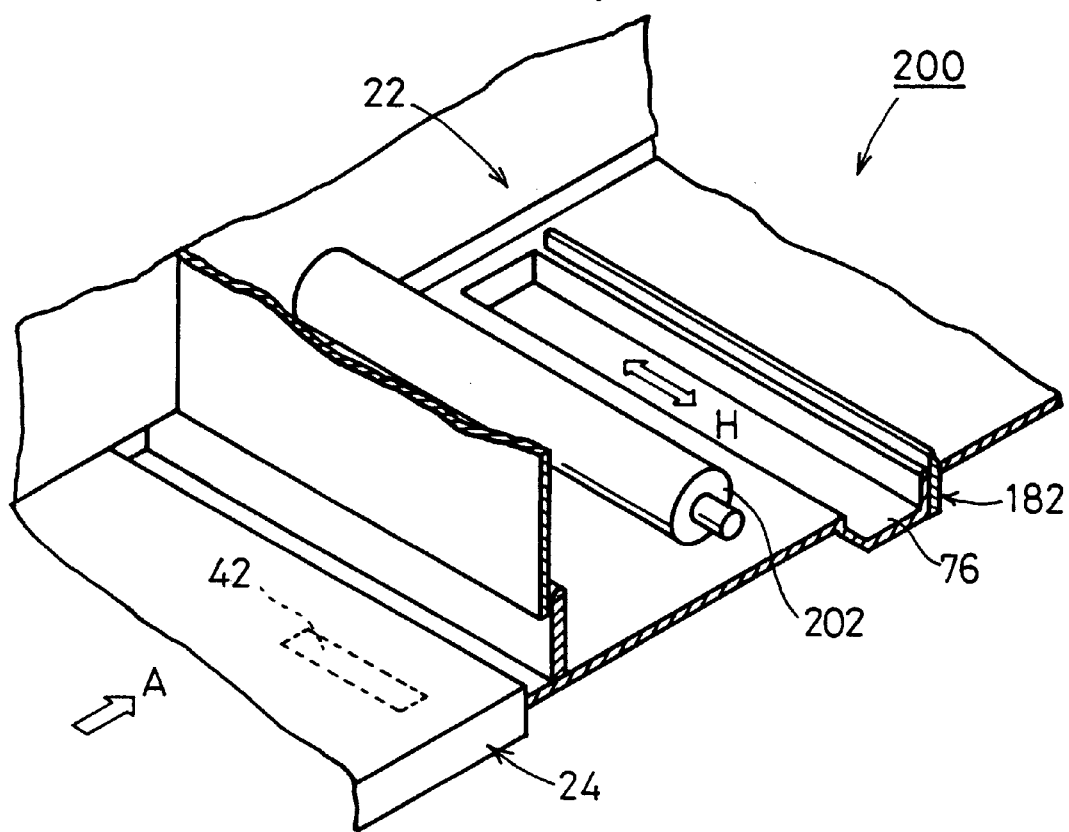
FIG. 13 is a fragmentary perspective view of a lead character removing apparatus according to a seventh embodiment of the present invention.
Figure 14:
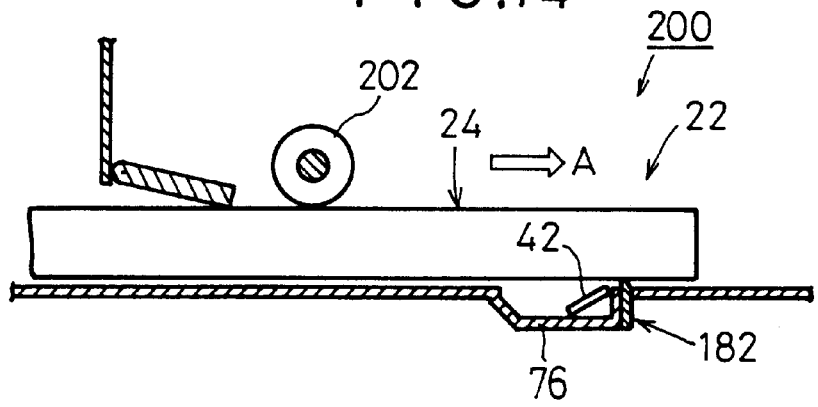
FIG. 14 is a side elevational view of the lead character removing apparatus.

FIG. 13 is a fragmentary perspective view of a lead character removing apparatus 200 according to a seventh embodiment of the present invention, and FIG. 14 is a side elevational view of the lead character removing apparatus 200.

The lead character removing apparatus 200 comprises the separating member 182 and a pushing roller 202 disposed upstream of the separating member 182 with regard to the direction in which the cassette 24 is loaded, for pushing the surface of the cassette 24 opposite to the surface to which the lead characters 42 are applied. The pushing roller 202 is elongatedly provided in the direction (direction indicated by the arrow H) perpendicular to the direction in which the cassette 24 is loaded, and is actuated toward the cassette 24 by an unillustrated spring or the like.

In the lead character removing apparatus 200 constituted as above, the upper surface of the cassette 24 (the surface opposite to the surface to which the lead characters 42 are applied) is pushed by the pushing roller 202 when the cassette 24 is loaded in the cassette loading section 22. Therefore, the cassette 24 can be effectively prevented from occurring undesirable conditions such as floating, so that the lead characters 42 reliably abuts against the separating member 182. Thus, the rejecting operation of the lead characters 42 can be performed more effectively.

Figure 15:
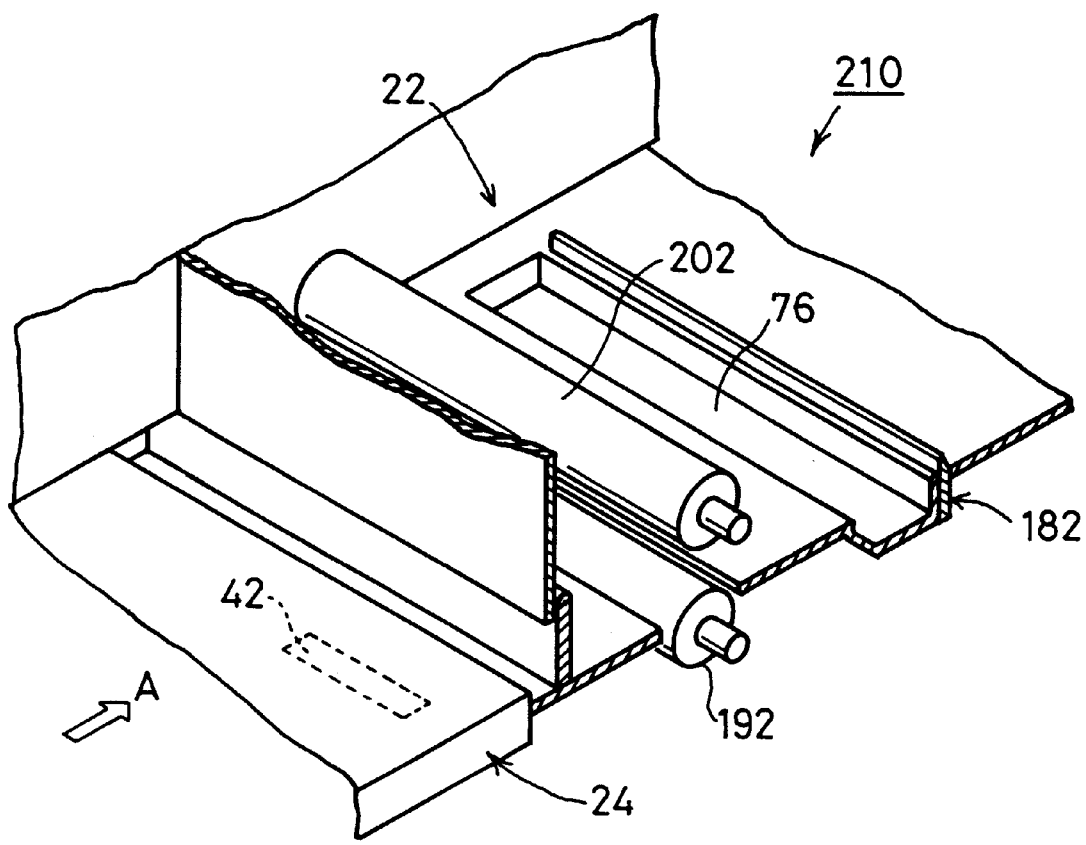
FIG. 15 is a fragmentary perspective view of a lead character removing apparatus according to an eighth embodiment of the present invention.
Figure 16:
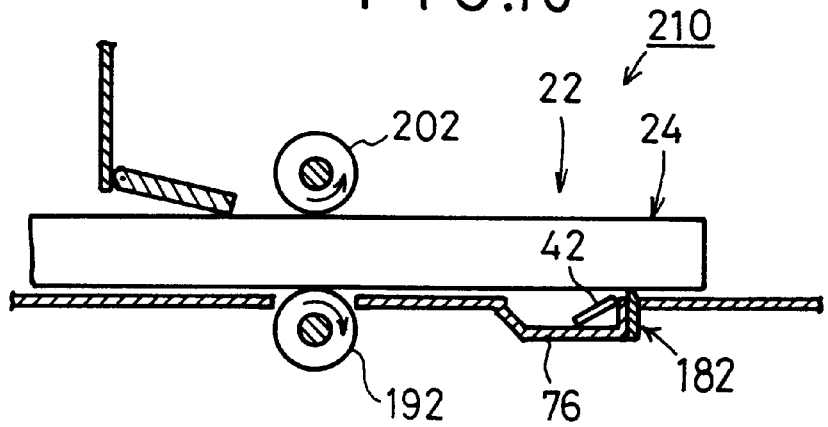
FIG. 16 is a side elevational view of the lead character removing apparatus.

FIG. 15 is a fragmentary perspective view of a lead character removing apparatus 210 according to an eighth embodiment of the present invention, and FIG. 16 is a side elevational view of the lead character removing apparatus 210.

The lead character removing apparatus 210 comprises the separating member 182, the actuating roller 192, and the pushing roller 202. In the lead character removing apparatus 210, the cassette 24 is automatically drawn into the cassette loading section 22 under the rotating action of the actuating roller 192, and the cassette 24 can be reliably prevented from floating by using the pushing roller 202. Therefore, the rejecting operation of the lead characters 42 by using the separating member 182 can be effectively and smoothly performed.

In the seventh embodiment or eighth embodiment, the pushing roller 202 may be replaced with a pushing member which has a sliding characteristic.

In the lead character removing apparatus according to the present invention, the roller is rotatably disposed in the cassette loading section in the processor, and rotated by the rotating mechanism relatively to the cassette in the direction which is opposite to the direction in which the cassette is loaded. As a result, the lead characters can reliably be scraped off the cassette with a highly simple arrangement, and are reliably prevented from falling in the processor. Because the lead characters are automatically scraped off the cassette, effective protection is ensured against a failure to remove the lead characters from the cassette.

Although certain preferred embodiments of the present invention have been shown and described in detail, it should be understood that various changes and modifications may be made therein without departing from the scope of the appended claims.

What is claimed is:

1. An apparatus of removing lead characters off a cassette which stores an image information recording medium with radiation image information recorded thereon, when the cassette is loaded into a processor, comprising:

a first roller disposed in a cassette loading section in the processor and rotatable in a position where the lead characters applied to the cassette pass; and a rotating mechanism for rotating said first roller relatively to said cassette in a direction opposite to the direction in which the cassette is loaded, thereby to remove the lead characters off the cassette.

2. An apparatus according to claim 1, wherein said first roller is made of synthetic resin and has a plurality of ridges projecting radially outwardly from an outer circumferential surface thereof.

3. An apparatus according to claim 1, wherein said first roller comprises a brush roller.

4. An apparatus according to claim 1, wherein said rotating mechanism comprises:

a second roller disposed upstream of said first roller with respect to the direction in which the cassette is loaded, and rotatable in the direction in which the cassette is loaded, in contact with the cassette when the cassette is loaded; and transmitting means for transmitting rotation of said second roller to said first roller as rotation in the direction opposite to the direction in which the cassette is loaded.

5. An apparatus according to claim 4, wherein said transmitting means comprises:

a first gear operatively connected to said second roller by a belt and pulley mechanism; and a second gear operatively connected to said first roller by a belt and pulley mechanism and held in mesh with said first gear.

6. An apparatus according to claim 4, wherein said second roller is made of synthetic resin.

7. An apparatus according to claim 1, wherein said rotating mechanism comprises:

a second roller disposed upstream of said first roller with respect to the direction in which the cassette is loaded, and rotatable in the direction in which the cassette is loaded, in contact with the cassette when the cassette is loaded; and transmitting means for transmitting rotation of said second roller to said first roller as rotation in the direction in which the cassette is loaded, at a speed lower than the speed at which the cassette is loaded.

8. An apparatus according to claim 7, wherein said transmitting means comprises:

a first pulley coaxially fixed to said second roller;

a second pulley larger in diameter than said first pulley and operatively connected to said first pulley by a first belt;

a third pulley smaller in diameter than said second pulley and coaxially fixed to said second pulley; and a fourth pulley coaxially fixed to said first roller, larger in diameter than said third pulley, and operatively connected to said third pulley by a second belt.

9. An apparatus according to claim 7, wherein said second roller is made of synthetic resin.

10. An apparatus according to claim 1, wherein said rotating mechanism comprises:

detecting means for detecting said cassette as it is being loaded into the processor; and a rotary actuator for rotating said first roller in the direction to remove the lead characters off the cassette, based on a detected signal from said detecting means.

11. An apparatus according to claim 1, further comprising lead character retrieval means disposed upstream of said first roller with respect to the direction in which the cassette is loaded, for receiving the lead characters removed from the cassette.

12. An apparatus according to claim 11, wherein said lead character retrieval means comprises a tray.

13. An apparatus of removing lead characters off a cassette which stores an image information recording medium with radiation image information recorded thereon, when the cassette is loaded into a processor, comprising:

a separating member disposed in a cassette loading section in said processor, wherein said separating member is in contact with lead characters applied to the cassette thereby to forcibly remove the lead characters off the cassette when the cassette is inserted into said cassette loading section.

14. An apparatus according to claim 13, further comprising a pushing roller disposed upstream of said separating member in said cassette loading section with regard to the direction in which the cassette is loaded, for pressing the lead characters against said separating member by pushing a surface of the cassette opposite to the surface to which the lead characters are applied.

15. An apparatus according to claim 13, further comprising an actuating roller disposed upstream of said separating member in said cassette loading section with regard to the direction in which the cassette is loaded, for drawing the cassette into said cassette loading section.

16. An apparatus according to claim 15, further comprising a pushing roller disposed upstream of said separating member in said cassette loading section with regard to the direction in which the cassette is loaded, for pressing the lead characters against said separating member by pushing a surface of the cassette opposite to the surface to which the lead characters are applied.

17. An apparatus according to claim 13, further comprising lead character retrieval means disposed upstream of said separating member with respect to the direction in which the cassette is loaded, for receiving the lead characters removed from the cassette.

18. An apparatus according to claim 17, wherein said lead character retrieval means comprises a tray.

\* \* \* \* \*